No. 628,887. Patented July 11, 1899.
R. JAVITCH.
AGRICULTURAL IMPLEMENT.
(Application filed May 10, 1899.)
(No Model.)
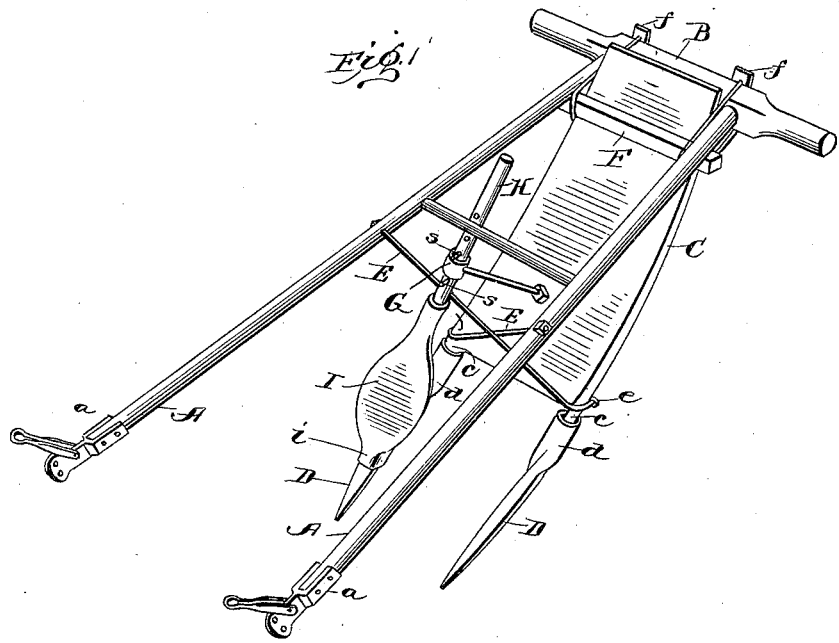
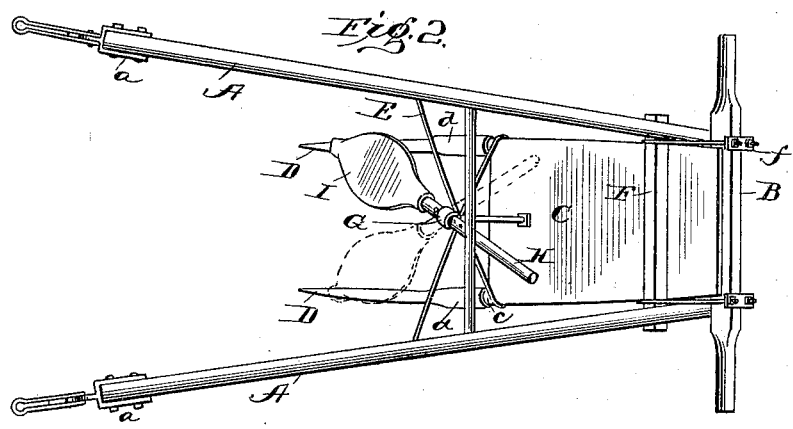
Witnesses
J. M. Fowler Jr.
Alexander J. Stuart.
Inventor
Rubin Javitch
his Attorney

UNITED STATES PATENT OFFICE.

RUBIN JAVITCH, OF MONONGAH, WEST VIRGINIA.

AGRICULTURAL IMPLEMENT.

SPECIFICATION forming part of Letters Patent No. 628,887, dated July 11, 1899.

Application filed May 10, 1899. Serial No. 716,238. (No model.)

*To all whom it may concern:*

Be it known that I, RUBIN JAVITCH, a citizen of the United States, and a resident of Monongah, in the county of Marion and State of West Virginia, have invented certain new and useful Improvements in Agricultural Implements; and I do hereby declare the following to be a full, clear, and exact description of the same, reference being had to the accompanying drawings, forming a part of this specification, and to the letters of reference marked thereon.

This invention relates to improvements in agricultural implements, and particularly such as are designed for pulverizing or breaking up the soil either for cultivating or for opening, as in digging potatoes, or for breaking the soil previous to planting; and the invention has for its object to provide an improved implement which may be drawn by one draft-animal and which at the same time will pulverize the soil to a considerable depth, turning over only the upper portion thereof in accordance with the approved modern agricultural methods, this feature of the invention being especially useful in breaking the soil previous to planting.

In the accompanying drawings, Figure 1 is a perspective view of the implement. Fig. 2 is a top plan view with the shovel or moldboard in full lines for throwing the soil from the furrow in one direction and in dotted lines for throwing the soil from the furrow in the opposite direction.

Like letters of reference in both the figures indicate the same parts.

In the preferred though not essential construction of frame illustrated in the accompanying drawings, wherein one embodiment of my invention is shown, that portion which corresponds to the beam of a plow is preferably divided and forms two forwardly-extending shafts or draft-beams A, having clevises $a$ at their forward ends for the attachment of the draft-animal and at their rear edge converge toward each other and are rigidly attached to a transverse piece or handle B. From this draft-frame and handle a standard, preferably formed by a single relatively wide board C, extends downwardly and at the lower end terminates in two projections $c$, each adapted to carry a metallic tooth or opener D. In the preferred construction the upper ends of these teeth or openers D are provided with sockets $d$, into which the projections $c$ on the standard C fit, and in this preferred construction also crossed brace-rods E extend between the lower portions of the standard C and the draft-frame A, such rods being preferably provided with eyes at their lower ends, coöperating with the hooks $e$ on the standard, and with threaded upper ends, which may be passed through the draft-frame and nuts applied thereto for supplying the proper tension.

As a further means for conveniently and cheaply assembling the parts a cross-piece F may be inserted between the standard C and draft-frame A at a point near their junction and by means of adjustable clips or loops $f$ may be drawn toward the handle B, tending thereby to separate the standard and draft-frame, which tendency is, however, resisted by the tension-braces E before referred to, the result being that the standard C is curved somewhat to present a symmetrical and graceful appearance.

The teeth D, it will be noticed, will penetrate deeply into the ground when drawn forward by the draft-animal and will serve to pulverize and break up the soil to a considerable depth, and in order now to form a furrow and to transfer and turn the upper portion of the soil I provide a shiftable moldboard or shovel I, which may be adjusted so as to coöperate with either one of said teeth and in such manner as to throw the soil in one direction or the other. Thus in breaking the soil the implement may be carried back and forth along substantially the same line and always transfer the soil in one direction.

In the preferred construction a central eye or bearing G, supported from the standard C, is provided, and through this eye or bearing G a moldboard lever or handle H extends in a substantially vertical direction, its upper end being within convenient reach of the operator, and its lower end supports an oval-shaped moldboard or shovel I, which latter at its lower end is provided with a recess or socket $i$, which fits around one of the teeth D and constitutes the support for the lower end of the moldboard or shovel. Obviously the socket may be brought into contact with the teeth at any desired distance from their lower ends or points, and this will determine the depth of soil which will be shifted or turned, while that portion of the tooth below the shovel or moldboard will simply subsoil or pulverize the soil or substrata below the mold-blade or shovel.

In operation now the implement is drawn across the field with the moldboard or shovel resting upon the tooth for shifting or turning the soil in the desired direction, and on the return movement of the implement the shovel or moldboard is shifted to the other tooth, thereby turning the soil in the same direction and overcoming any difficulty incident to the use of an implement which must be constantly used for turning the soil in one direction. It will be noted that the moldboard or shovel is of substantially oval shape in the preferred construction illustrated. Thereby the pressure of the soil will be uniformly distributed and will cause little or no tendency of the moldboard or shovel to turn on its vertical axis. This tendency is furthermore resisted, should it occur by unequal pressure of the soil, by making the teeth rectangular in cross-section and forming the end of the moldboard or shovel of a shape to fit said teeth and so prevent any rocking movement.

The clevises at the forward end of the draft-frame are preferably made vertically adjustable, so as to vary the angle of draft, and thereby cause the implement to run deep or shallow, as desired.

Obviously the moldboard or shovel may be adjusted vertically by varying its point of attachment to the eye or bearing in which it works, and this may be accomplished by shifting the pins s from one to the other of a series of holes in the handle or lever.

Having thus described my invention, what I claim is—

1. In an agricultural implement the combination with a draft-frame and a downwardly-extending frame attached thereto and having soil-pulverizing teeth at its lower end, of a moldboard or shovel pivotally supported at its upper end, and having a socket at its lower end for coöperating with one or the other of said teeth, substantially as described.

2. In an agricultural implement the combination with the draft-frame, the downwardly-extending frame attached thereto, and separate soil-pulverizing teeth attached to the lower end of said downwardly-extending frame, of a moldboard or shovel having a socket at its lower end for engaging one or the other of said teeth, a pivotal bearing for the upper end of said moldboard or shovel and a lever or handle extending upwardly from said bearing for manipulating said moldboard or shovel; substantially as described.

3. In an agricultural implement the combination with a draft-frame, a downwardly-extending frame carried by said draft-frame and having downwardly-extending soil-pulverizing teeth at its lower end, of a shovel or moldboard mounted in a pivotal bearing carried by the downwardly-extending frame and an upwardly-extending handle for manipulating said moldboard or shovel; substantially as described.

4. In an agricultural implement the combination with a draft-frame and a pair of downwardly-extending soil-pulverizing teeth carried thereby, of a shiftable moldboard adapted to coöperate with one or the other of said teeth for turning the soil in either direction as desired and an upwardly-extending lever or handle for manipulating said moldboard or shovel; substantially as described.

5. In an agricultural implement, the combination with the draft-frame and the downwardly-extending soil-pulverizing teeth carried thereby, of a substantially oval moldboard or shovel adapted to coöperate with one or the other of said teeth at its lower end, an upwardly-extending lever or handle for supporting said moldboard and an adjustable connection between said handle or lever and the frame of the implement; substantially as described.

6. In an agricultural implement the combination of a draft-frame, a downwardly-extending standard attached at its upper end to the rear end of said draft-frame, braces connecting said draft-frame and the lower end of the standard and soil-pulverizing teeth attached to the lower end of said standard, of a shovel or moldboard having its lower end formed to coöperate with one or the other of said teeth, an upwardly-extending lever or handle for supporting and manipulating said moldboard and an eye or bearing carried by the standard for supporting said handle or lever; substantially as described.

RUBIN JAVITCH.

Witnesses:
JNO. B. PEYTON, Jr.,
VIRGINIA B. NEWTON.